US008111208B2

(12) United States Patent
Brown

(10) Patent No.: US 8,111,208 B2

(45) Date of Patent: Feb. 7, 2012

(54) FRONT AND REAR REMOVABLE PANEL FOR ELECTRONIC DISPLAYS

(75) Inventor: Brent W. Brown, Farmington, UT (US)

(73) Assignee: Young Electric Sign Company, Salt Lake City, UT (US)

( * ) Notice: Subject to any disclaimer, the term of this patent is extended or adjusted under 35 U.S.C. 154(b) by 819 days.

(21) Appl. No.: 11/448,594

(22) Filed: Jun. 6, 2006

(65) Prior Publication Data

US 2007/0279314 A1 Dec. 6, 2007

(51) Int. Cl.

| | |
|---|---|
| ***G09G 5/00*** | (2006.01) |
| ***G09G 3/20*** | (2006.01) |
| ***G06F 3/038*** | (2006.01) |
| ***G08B 5/22*** | (2006.01) |

(52) U.S. Cl. ........... 345/1.3; 345/55; 345/204; 345/903; 340/815.45

(58) Field of Classification Search ............ 345/1.1–1.3, 345/39, 46, 55, 82–83, 204–206, 903, 905; 40/541–552, 624, 662–663, 671; 174/539, 174/542, 562, 563; 340/815.45, 815.49; 248/917–918; 160/135, 160, 165, 175, 180–185
See application file for complete search history.

(56) References Cited

U.S. PATENT DOCUMENTS

| | | | | |
|---|---|---|---|---|
| 2,260,048 | A * | 10/1941 | Newell | 411/552 |
| 3,223,872 | A | 12/1965 | Raibourn | |
| 3,291,975 | A * | 12/1966 | McCullough et al. | |
| 3,768,186 | A | 10/1973 | Chase et al. | |
| 3,827,169 | A | 8/1974 | Chase et al. | |
| 3,975,878 | A * | 8/1976 | Modarelli, Jr. | 52/285.2 |
| 4,129,395 | A * | 12/1978 | Theurer et al. | 403/317 |
| 5,212,596 | A | 5/1993 | Andrus | |
| 5,225,933 | A | 7/1993 | Myers et al. | |
| 5,316,359 | A | 5/1994 | Lansinger | |
| 5,337,502 | A | 8/1994 | Hopkins | |
| 5,949,581 | A * | 9/1999 | Kurtenbach et al. | |
| 6,154,945 | A * | 12/2000 | Voelzke | 29/426.5 |
| 6,169,632 | B1 * | 1/2001 | Kurtenbach et al. | 359/621 |
| 6,267,543 | B1 * | 7/2001 | David et al. | |
| 6,657,605 | B1 | 12/2003 | Boldt, Jr. et al. | |
| 6,737,983 | B1 * | 5/2004 | Temple | 340/815.45 |
| 6,741,222 | B1 * | 5/2004 | Tucker | 345/1.1 |
| 6,813,853 | B1 * | 11/2004 | Tucker | 40/448 |

(Continued)

FOREIGN PATENT DOCUMENTS

EP 0863496 A3 5/1999

(Continued)

*Primary Examiner* — Bipin Shalwala
*Assistant Examiner* — Matthew Fry
(74) *Attorney, Agent, or Firm* — TraskBritt

(57) ABSTRACT

Display apparatus and methods of making them are disclosed. The display apparatus includes frame members assembled to form a frame for the display apparatus and display modules configured for displaying at least a portion of an adaptable image. Each display module is coupled to the frame members to form a matrix organization of display modules for the display apparatus. The display module includes a removable panel and apertures formed therethrough. The apertures are arranged as pixel rows including pixel arrangements distributed along each pixel row. The display module also includes coupling devices attached to the removable panel, which are configured for detachably coupling the removable panel to the frame members, wherein the coupling devices may be operated to attach or remove the removable panel. Furthermore, the coupling devices are configured such that they can be operated from a front side or from a back side of the removable panel.

34 Claims, 6 Drawing Sheets

U.S. PATENT DOCUMENTS

| | | | | |
|---|---|---|---|---|
| 6,816,389 | B1 * | 11/2004 | Lutz et al. | 361/801 |
| 6,945,616 | B2 | 9/2005 | Webster et al. | |
| 7,055,271 | B2 * | 6/2006 | Lutz et al. | 40/605 |
| 7,453,419 | B2 * | 11/2008 | Yee et al. | 345/39 |
| 7,682,043 | B2 * | 3/2010 | Malstrom et al. | |
| 2002/0059742 | A1 * | 5/2002 | Okazaki et al. | 40/550 |
| 2002/0122134 | A1 * | 9/2002 | Kalua | |
| 2003/0058643 | A1 | 3/2003 | Barlow et al. | |
| 2004/0104871 | A1 | 6/2004 | Boldt, Jr. et al. | |
| 2004/0163290 | A1 | 8/2004 | Pena | |
| 2005/0050779 | A1 | 3/2005 | Tsao | |
| 2006/0055641 | A1 | 3/2006 | Robertus et al. | |
| 2006/0055642 | A1 | 3/2006 | Daughenbaugh et al. | |
| 2007/0000849 | A1 * | 1/2007 | Lutz et al. | 211/26 |
| 2007/0001927 | A1 * | 1/2007 | Ricks et al. | 345/1.1 |

FOREIGN PATENT DOCUMENTS

| | | | |
|---|---|---|---|
| EP | 0863496 | B1 | 10/2002 |
| WO | WO 03/056535 | A1 | 7/2003 |
| WO | WO 2004/042690 | A1 | 5/2004 |
| WO | WO 2004/097783 | A1 | 11/2004 |

* cited by examiner

FRONT AND REAR REMOVABLE PANEL FOR ELECTRONIC DISPLAYS

CROSS-REFERENCE TO RELATED APPLICATION

This application is related to U.S. patent application Ser. No. 12/416,856, filed on Apr. 1, 2009, pending, titled "Incident Light Management Devices and Related Methods and Systems," assigned to the assignee of the present application.

BACKGROUND OF THE INVENTION

1. Field of the Invention

The present invention relates generally to displaying images, more specifically, to displaying images on display boards and billboards.

2. State of the Art

Billboards and large signs have been used for many years to convey information to passersby such as advertising, traffic messages, and the like. Traditionally these signs and billboards were only capable of delivering a single message or advertisement. This message was generally printed on strips of paper that were then adhered to the billboard. To change the message, new paper needed to be printed and adhered to the billboard.

More recently, display boards and billboards have become electronic using lights, light-emitting diodes (LEDs), and combinations of the two to display a visual message that could be easily adaptable to display a wide variety of messages in the form of words and images from the same sign without having to physically change the characteristics of the sign. These electronic boards can easily modify a graphic image or message to create video displays and modify the type of message or advertisement that is shown on the electronic board at regular intervals, or at targeted times depending on expected traffic near the sign, or public interest. These possible images are generally referred to herein as adaptable images.

While the adaptable images may be changed easily on these electronic boards, maintaining and servicing an electronic board with thousands (or even hundreds of thousands) of lights attached to the electronic boards can be problematic. Smaller removable panels, which may be tiled together, have been proposed to make this maintenance task easier. With smaller removable panels, a single panel may be removed for service or replacement.

Furthermore, removable panels create joints between the panels. These joints can be sources of misalignment between panels, which may cause an image that spans many panels to be distorted. In addition, these joints may lead to problems with protecting the LEDs, lights, circuit boards, and other electronic components from damage due to environmental factors.

Therefore, there is a need for an electronic display capable of displaying an adaptable image that can be easily serviced from both the front and the rear. Furthermore, there is a need for a modular design wherein the electronic display comprises a plurality of removable panels that are easily removable from both the front and rear for service or replacement. There is also a need to protect the electronic elements of the display apparatus and removable panels from environmental elements to increase the service life, reliability, and performance of the removable panels. In addition, there is a need for easily aligning these removable panels relative to each other to minimize image distortion for images that span multiple removable panels.

BRIEF SUMMARY OF THE INVENTION

The present invention provides electronic display apparatuses and methods of making the apparatuses, as well as removable panels configured as portions of a modular design for the electronic displays, wherein the removable panels may be attached and removed from both the front and rear of the electronic display. The removable panels may also be configured for attachment to a frame in such a manner that electronic elements are substantially protected from potentially damaging environmental elements.

One embodiment of the present invention comprises a display module for displaying an adaptable image or a portion of an adaptable image. The display module includes a removable panel including a plurality of apertures formed through the removable panel. The plurality of apertures are arranged as at least one pixel row comprising a plurality of pixel arrangements distributed along the at least one pixel row. Each pixel arrangement includes at least one aperture of the plurality of apertures. The display module also includes a plurality of coupling devices attached to the removable panel. The coupling devices are configured for detachably coupling the removable panel to a frame member, wherein the coupling devices may be operated to attach or remove the removable panel. Furthermore, the coupling devices are configured such that they can be operated from a front side of the removable panel or from a back side of the removable panel.

Another embodiment of the present invention comprises display apparatus for displaying an adaptable image. The display apparatus includes a plurality of frame members to form a frame for the display apparatus and a plurality of display modules configured for displaying an adaptable image or a portion of an adaptable image. The display module includes a removable panel including a plurality of apertures formed through the removable panel. The plurality of apertures is arranged as at least one pixel row comprising a plurality of pixel arrangements distributed along the at least one pixel row. Each pixel arrangement includes at least one aperture of the plurality of apertures. The display module also includes a plurality of coupling devices attached to the removable panel. The coupling devices are configured for detachably coupling the removable panel to a frame member, wherein the coupling devices may be operated to attach or remove the removable panel. Furthermore, the coupling devices are configured such that they can be operated from a front side of the removable panel or from a back side of the removable panel. In addition, each display module of the plurality of display modules is coupled to at least one of the frame members to form a matrix organization of display modules for the display apparatus.

Yet another embodiment of the present invention comprises a method of making a display apparatus, comprising forming a removable panel and forming a plurality of apertures through the removable panel such that the plurality of apertures is arranged in at least one pixel row. Each pixel row includes a plurality of pixel arrangements distributed along the pixel row wherein each pixel arrangement includes at least one of the plurality of apertures. The method also includes attaching a plurality of coupling devices to the removable panel, wherein the coupling devices are configured for detachable coupling to a frame member. Furthermore, the coupling devices are configured such that they can be operated from a front side of the removable panel or from a back side of the removable panel.

BRIEF DESCRIPTION OF THE DRAWINGS

In the drawings, which illustrate what is currently considered to be the best mode for carrying out the invention.

DETAILED DESCRIPTION OF THE INVENTION

The present invention provides apparatuses and methods of making the apparatuses for electronic displays and removable panels configured as portions of a modular design for the electronic displays, wherein the removable panels may be attached and removed from both the front and rear of the electronic display. The removable panels may also be configured for attachment to a frame such that electronic elements are substantially protected from potentially damaging environmental elements.

Figure 1A:
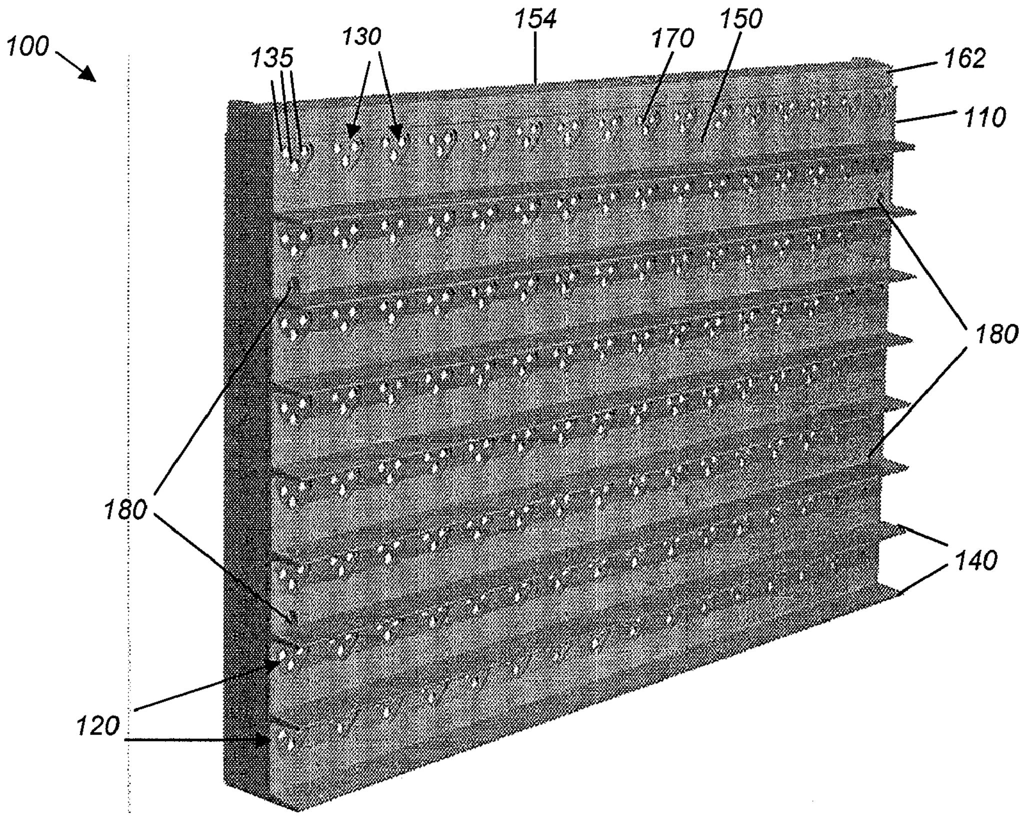
FIG. 1A is a perspective view illustrating a front portion of a removable panel according to a representative embodiment of the present invention.
Figure 1B:
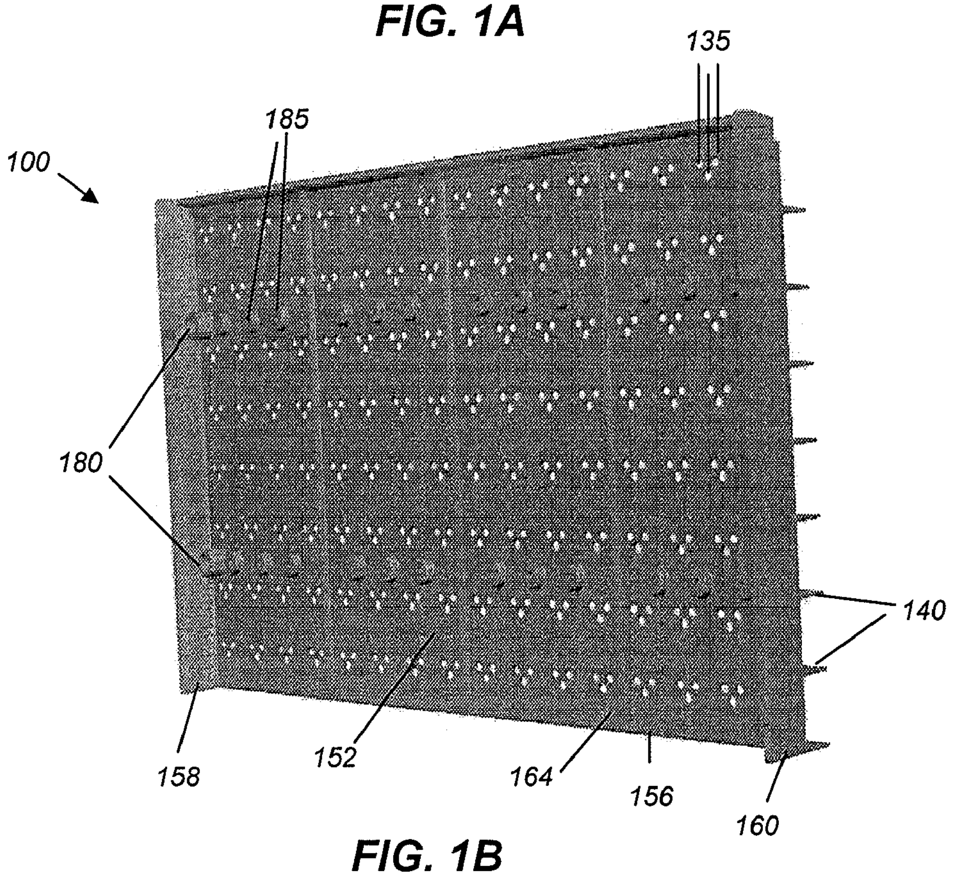
FIG. 1B is a perspective view illustrating a rear portion of a removable panel according to a representative embodiment of the present invention.

FIGS. 1A and 1B illustrate a front portion and a rear portion, respectively, of a display module 100 according to a representative embodiment of the present invention. A plurality of display modules 100 may be organized together to form a display apparatus. The display module 100 includes a removable panel 110, which includes a plurality of apertures 135 (which may also be referred to herein as pixel holes, or simply as holes) formed though the removable panel 110. The removable panel 110 may include multiple pixel rows 120, wherein each pixel row 120 includes a plurality of pixel arrangements 130, and each pixel arrangement 130 may include three apertures 135 for receiving light-emitting diodes (LEDs) (not shown), or other suitable light-emitting devices. Although the removable panel 110 is illustrated with a plurality of rows, those of ordinary skill in the art will recognize that within the scope of the present invention, the removable panel 110 may be formed of a single pixel row 120. The removable panel 110 may be formed of any suitable material, such as, for example, plastic, fiberglass, or metal.

In the representative embodiments illustrated herein, the display module 100 includes a horizontal fin 140 (which may also be referred to herein as a louver) disposed above each pixel row 120 for shading the LEDs. The horizontal fin 140 creates a means for shading the pixel arrangements 130 from direct sunlight when installed outdoors, or from overhead light when installed indoors. Consequently, the horizontal fin 140 enables a higher contrast ratio, which may assist in viewing the billboard and making an adaptable image appear as if it includes greater intensity and more vibrant colors. In addition, the horizontal fins 140 may assist in drawing heat away from the LEDs and circuitry mounted behind the removable panel 110. In the representative embodiments illustrated herein, the removable panel 110 is formed of plastic with the horizontal fins 140 also formed of plastic and as an integral part of the removable panel 110. However, the horizontal fins 140 may be formed separately and, for example, be overlayed onto the front of the removable panel 110. Embodiments of the present invention also may be formed of a dark colored material, which may further enhance the contrast ratio.

The removable panel 110 includes a front side 150, a back side 152, a protrusion 162 (shown in more detail in FIG. 5) extending from a top side 154, and a receiving rim 164 (shown in more detail in FIG. 5) along a bottom side 156. Also shown in FIGS. 1A and 1B are a right side protrusion 158 and a left side protrusion 160 extending from the front side 150 of the removable panel 110 toward the back side 152 of the removable panel 110. Spacers 185 may be disposed on the back side 152, which may be used to create an offset of a circuit board relative to the back side 152 of the removable panel 110 as is explained more fully below with respect to FIGS. 6A-6D.

Figure 1C:
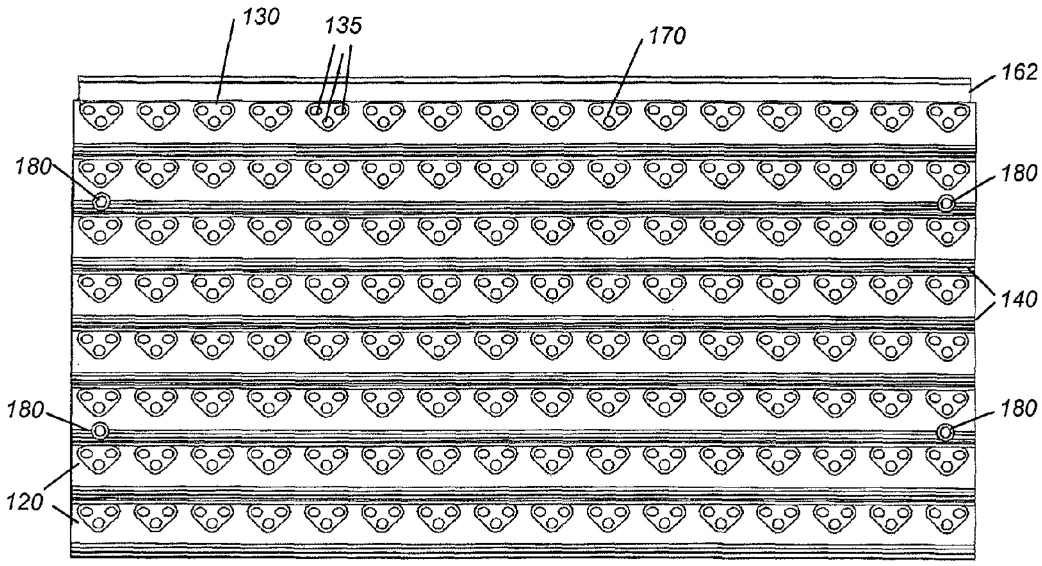
FIG. 1C illustrates a front view of a removable panel according to a representative embodiment of the present invention.

For attachment, the representative embodiment of the removable panel 110 illustrated in FIGS. 1A, 1B, and 1C includes four coupler holes 180 formed through the removable panel 110. These coupler holes 180 are configured for receiving coupling devices (not shown) that may be used for coupling the removable panel 110 to frame members of a full display apparatus. Of course, the other embodiments of the removable panel 110 may include less than, or more than, the four coupler holes 180 illustrated in FIGS. 1A-1C.

Figure 4A:
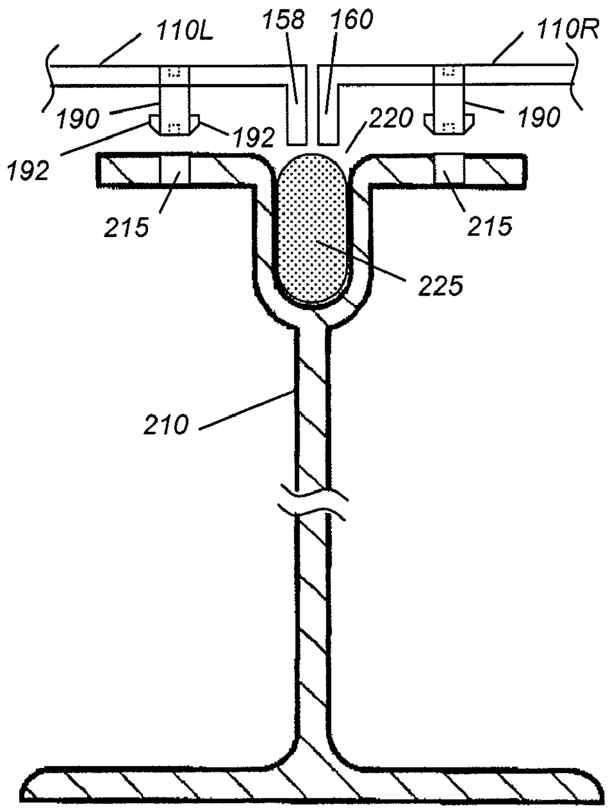
FIG. 4A illustrates a frame member and two removable panels prior to attachment.
Figure 4B:
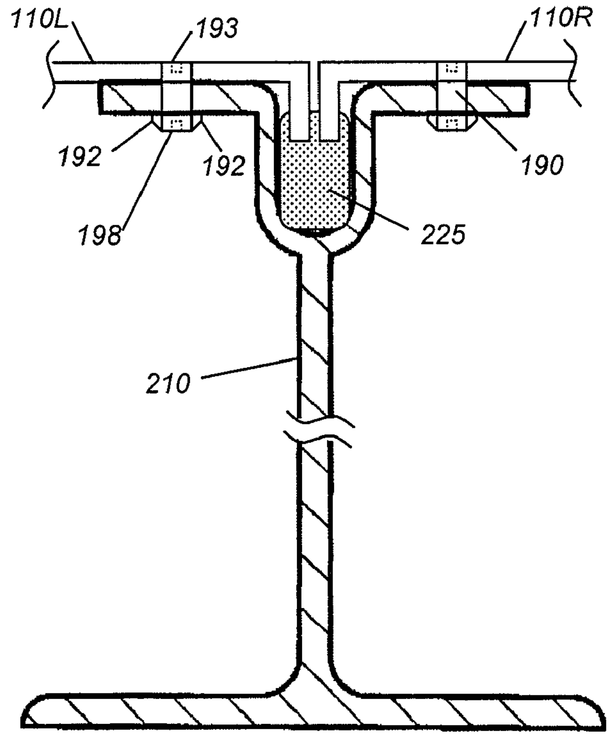
FIG. 4B illustrates a frame member and two removable panels after attachment.

FIG. 1C illustrates a front view of the removable panel 110 according to the representative embodiment of the present invention illustrated in FIGS. 1A and 1B. FIG. 1C more clearly illustrates a representative placement of pixels arrangements along the pixel rows 120 and the three apertures 135 for each pixel arrangement 130. FIG. 1C also illustrates the coupler holes 180 in the removable panel 110 configured for receiving coupling devices 190, which may be used to attach the removable panel 110 to a frame. The coupling devices 190 and attachment of the removable panel 110 to a frame are shown in FIGS. 4A and 4B and are explained more fully below in the discussion of those figures. Also shown are recesses 170, wherein each recess 170 encompasses the three apertures 135 comprising a pixel arrangement 130. The recesses 170 may be seen in more detail in FIGS. 6A-6D and are explained more fully below in the discussion of FIGS. 6A-6D.

Of course, those of ordinary skill in the art will recognize that other pixel arrangements 130 are contemplated within the scope of the present invention. For example, a pixel arrangement 130 may include a single hole for a single light element or two holes for two light elements such as, for example, LEDs. Such a configuration of one or two LEDs may be used for a monochrome display, or may be configured with multi-color LEDs for each pixel, such that a multi-color display may be achieved even from a single LED for each pixel. In the representative embodiments illustrated herein, three holes are used for a pixel arrangement 130 such that the light from a red LED, a green LED, and a blue LED may be combined to generate any possible color for a full color spectrum video display capable of showing still images and video images using conventional computer color maps. In addition, in some cases it may be desirable to include different colors of LEDs, or include more than one LED of the same color. As a result, pixel arrangements 130 may also include four or more apertures 135 for including a variety of LED colors.

Figure 2:
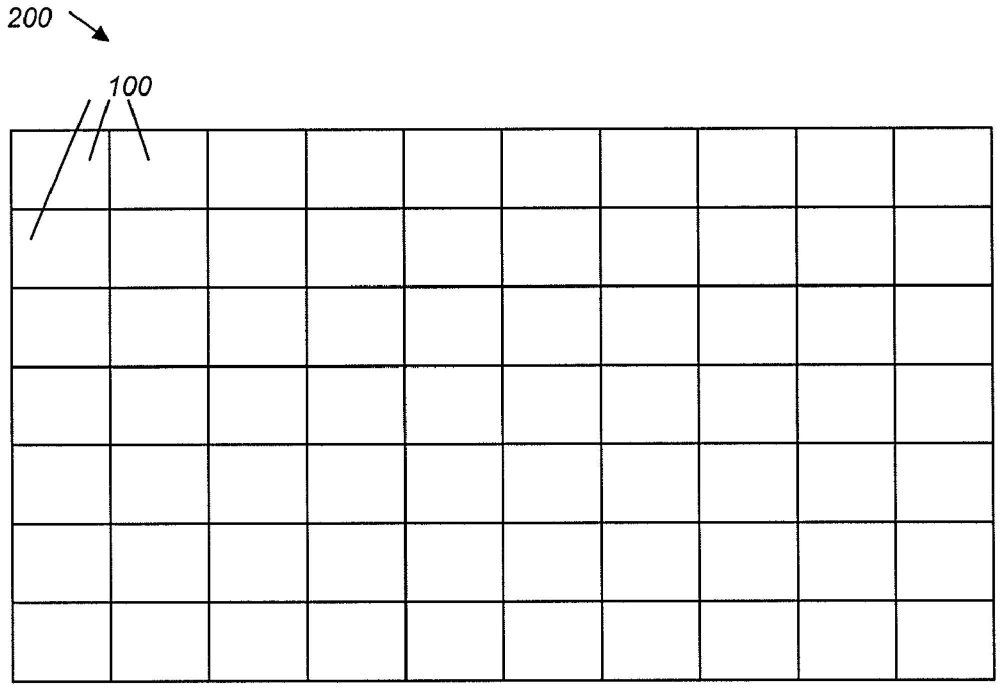
FIG. 2 illustrates a plurality of removable panels arranged in a matrix organization.

FIG. 2 illustrates a plurality of display modules 100 arranged in a matrix organization to comprise a display apparatus 200. These modules may be arranged in a variety of configurations for different applications. For example, the matrix organization may include a single row of removable panels 110 (or a single column of removable panels 110) for creating a narrow yet long display, which may be suitable for displaying messages in a traveling ticker-tape type of arrangement. A small number of removable panels 110 may be used to create a relatively small display apparatus 200, or a large number of removable panels 110 may be arranged to create a relatively large display apparatus 200. By way of example, and not limitation, a relatively large billboard size display apparatus 200 may include a matrix organization of 1100 or more removable panels 110 in a rectangular configuration.

Figure 3:
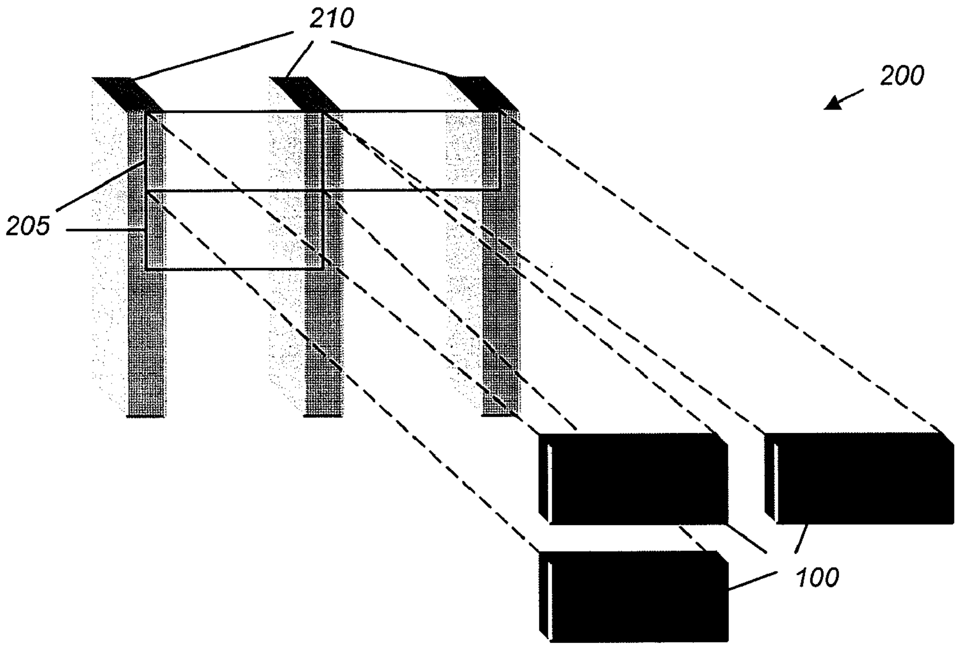
FIG. 3 illustrates an exploded view of removable panels for attachment to frame members.

FIG. 3 illustrates an exploded view of display modules 100 for attachment to frame members 210 as part of the display apparatus 200. In the presently described embodiment, the frame members 210 extend vertically and each removable panel 110 may be placed in a removable panel position 205 such that it abuts a neighboring display module 100 horizontally. The display modules 100 also may be stacked vertically to form the overall display apparatus 200 for presenting the adaptable image. The overall display apparatus 200 may be configured to display an adaptable image, such as, for example, a series of still images, or a video image. In many embodiments, which include many display modules 100, each display module 100 may be configured to form only a relatively small portion of the overall adaptable image. As a result, alignment and registration of the various display modules 100 relative to each other may be important to present a large, coherent image. Features of representative embodiments of the present invention include means for enabling this alignment and registration as the display modules 100 are attached to the frame members 210 at the various removable panel positions 205 of the display apparatus 200.

FIG. 4A illustrates a cross-sectional view of a frame member 210 and two removable panels (110L and 110R) prior to attachment and FIG. 4B illustrates a cross-sectional view of the frame member 210 and two removable panels (110L and 110R) after attachment to the frame member 210. The frame member 210 includes a vertical channel 220 that runs along substantially the length of the frame member 210. The frame member 210 is shown in a cross-sectional view, therefore, the vertical direction of the channel 220 refers to its running the vertical length of the frame member 210 as it is oriented vertically as part of the display apparatus 200, rather than the vertical direction of the cross-sectional figure. The frame member 210 illustrated in FIGS. 4A and 4B is illustrated generally as an I-beam type configuration. However, those of ordinary skill in the art will recognize that many other configurations and cross-sections for the frame member 210 are possible and are contemplated within the scope of the present invention.

As mentioned previously, the removable panels (110L and 110R) include a right side protrusion 158 and a left side protrusion 160 at the sides of the removable panels (110L and 110R). The right side protrusion 158 and the left side protrusion 160 are configured such that they can abut against each other and both protrusions 158, 160 can fit at least partially inside of the vertical channel 220. This abutting arrangement, and the disposition inside the vertical channel 220 substantially aligns multiple removable panels 110 in the vertical direction of the overall display apparatus 200, as well as the depth of placement relative to the face of the frame member 210 (i.e., vertically in the cross-sectional drawing). In addition, the abutting arrangement and disposition in the vertical channel 220 creates a seal that provides substantial protection from encroachment of water, air, and other contaminants along the left sides and right sides of the removable panels 110.

To form an enhanced seal, a gasket 225 may be disposed in the vertical channel 220 prior to disposing the right side protrusion 158 and left side protrusion 160 in the vertical channel 220. This gasket 225 may be formed of any partially deformable material suitable for accepting the right side and left side protrusions (158 and 160) and making a substantially watertight seal, such as, for example, any suitable sealant, caulking, foam, rubber gasket, or other gasket-type material.

Also illustrated in FIGS. 4A and 4B are attachment holes 215 formed through the front face of the frame member 210 and the coupling devices 190 attached to the removable panels 110. FIG. 4B illustrates the frame member 210 and the two removable panels (110L and 110R) after attachment using the coupling devices 190. The coupling devices 190 are configured such that when they are attached to the removable panel 110 they can be operated from the front of the removable panel 110 or from the back of the removable panel 110 for attachment of the removable panel 110 to the frame member 210. The coupling devices 190 may be any suitable attachment device, such as a screw, bolt, fastener, retainer, and the like.

The representative embodiment of the coupling devices 190 illustrated in FIGS. 4A and 4B also illustrates a front adjustment adaptor 193 on a front face of the coupling device 190 and a rear adjustment adaptor 198 on the rear face of the coupling device 190. These adjustment adaptors may be any adaptor suitable for operating the coupling devices 190. By way of example, and not limitation, if the coupling devices 190 are operated by rotation, the front and rear adjustment adaptors 193, 198 may be a screwdriver slot, a Phillips head slot, a square key, a hex key, a star key, a hex head, a square head, a wing-nut, and the like.

Furthermore, the representative embodiment of the coupling devices 190 illustrated in FIGS. 4A and 4B is configured with flanges 192 on opposite sides of a substantially cylindrical coupling device 190. In attaching the removable panels (110L and 110R) to the frame members 210, the flanges 192 may be aligned with key slots 218 (as shown in cut-away bottom view 216) in the attachment holes 215 of the frame member 210. After aligning the flanges 192 with the key slots and placing the coupling devices 190 inside the attachment holes 215, the flanges 192 protrude through to the back side of the frame member 210 such that about a quarter turn of the coupling device 190 in a first direction will fasten the removable panel 110 to the frame member 210 by the flanges 192 being seated against the back side of the frame member 210. After attachment, about a quarter turn of the coupling device 190 in a second direction will align the flanges 192 on the coupling device 190 with the key slots in the attachment holes 215 such that the coupling device 190 may slide through the attachment hole 215 and the removable panel 110 is enabled for removal. With the coupling devices 190 operated for removal, the removable panel 110 may be pulled free from the frame member 210. Due to an overlap mechanism, described more fully below with respect to FIG. 5, the removable panel 110 may need to be rotated slightly such that the lower portion of the removable panel 110 is pulled free from the frame member 210 first to enable the protrusion 162 (FIG. 1C) at the top of the removable panel 110 to be pulled free from under the removable panel 110 that is positioned above the removable panel 110 that is being removed.

Figure 5:
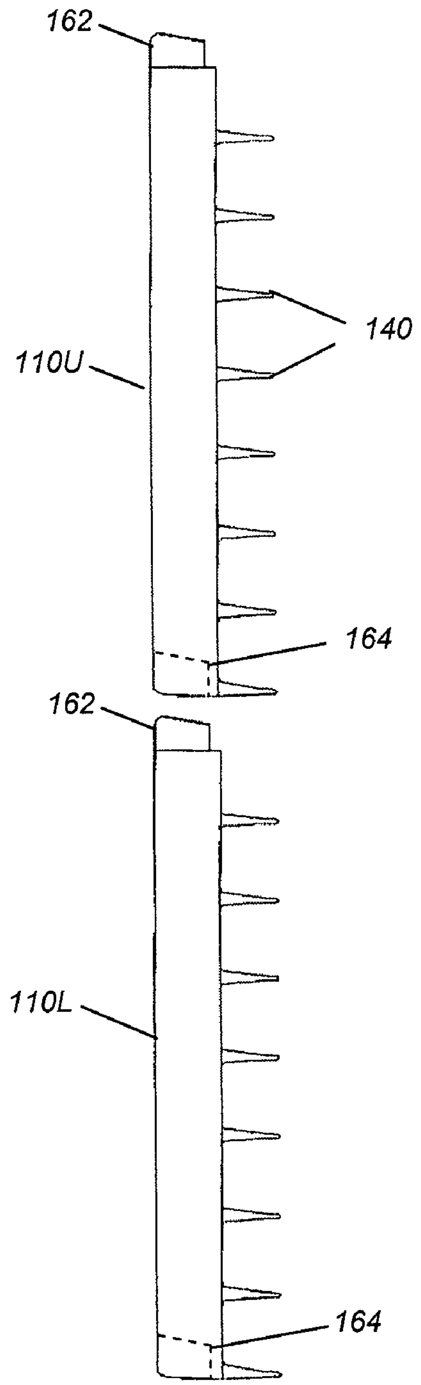
FIG. 5 shows one removable panel above another removable panel to illustrate how they adjoin vertically to provide protection from environmental elements.

FIG. 5 shows one removable panel above another removable panel to illustrate the overlap mechanism and how the removable panels adjoin to provide further protection from environmental elements. A lower removable panel 110L illustrates the protrusion 162 extending from the top of the lower removable panel 110L. An upper removable panel 110U illustrates a rabbet-type configuration formed in the bottom side of the upper removable panel 110U for receiving the protrusion 162 from the lower removable panel 110L. The rabbet-type configuration includes a receiving rim 164, such that when the lower removable panel 110L and upper removable panel 110U are joined, the receiving rim 164 of the upper removable panel 110U overlaps and cooperatively engages the protrusion 162 of the lower removable panel 110L in a shingle-type arrangement.

In a dry fit configuration, this shingle-type arrangement creates a seal that provides substantial protection from water, air, and contaminant encroachment along the top sides and bottom sides of the removable panels 110. For additional protection, a sealant (not shown) may be applied between the upper removable panel 110U and the lower removable panel 110L, or between the protrusion 162 and the receiving rim 164, to provide a more robust seal. The sealant may be any suitable sealant, caulking, foam, or gasket type material that can form a substantially watertight seal.

Figure 6A:
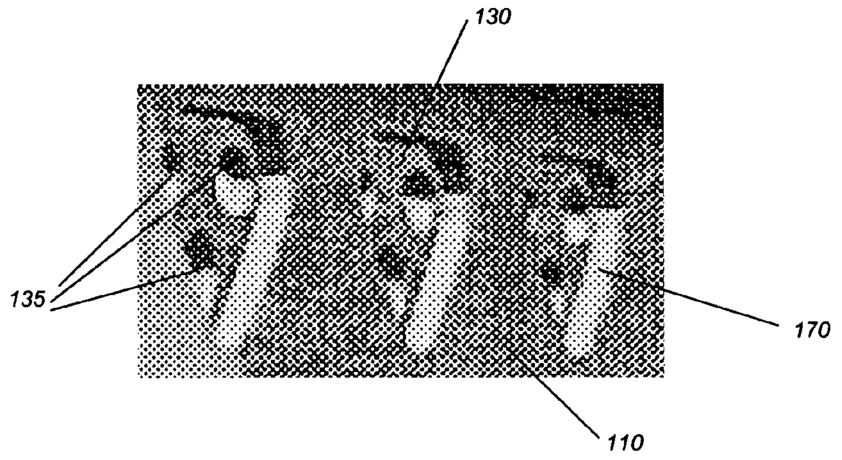
FIG. 6A illustrates a representative embodiment of some pixel arrangements.

FIG. 6A illustrates a representative embodiment of a representative pixel arrangement 130 in the removable panel 110. In this embodiment, each pixel arrangement 130 includes three apertures 135 and is encompassed by a recess 170.

Figures 6B, 6C, 6D:
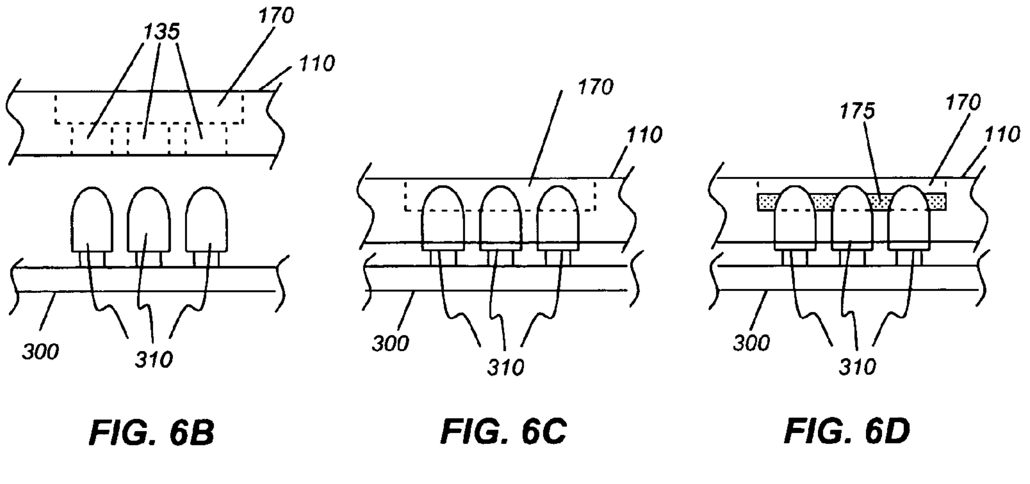
FIG. 6B illustrates a side view of LEDs forming one pixel on a portion of a circuit board and a portion of a removable panel showing one pixel arrangement.
FIG. 6C shows the circuit board portion and removable panel portion of FIG. 6B assembled together.
FIG. 6D shows the assembly of FIG. 6C with a sealant disposed in a recess of the removable panel.

FIG. 6B illustrates a side view of the representative pixel arrangement 130 in the removable panel 110 showing the apertures 135 and the recess 170. Also shown in FIG. 6B is a circuit board 300 bearing three LEDs 310 prior to the circuit board 300 being coupled to the removable panel 110. As stated earlier, using three LEDs 310 to form a pixel is one possible embodiment of a pixel wherein the LEDs 310 may comprise a red LED, a green LED and a blue LED.

In many conventional display boards using LEDs 310, the circuit board 300 bearing the LEDs 310 is covered with a potting material to cover the circuit board 300 and the lower portions of the LEDs 310. This potting material may act to protect the LEDs 310 and circuit board 300 from environmental elements. However, potting material on the circuit board, around the ICs, components and the leads of the LEDs increases thermal resistance, impeding heat transfer away into the air. Furthermore, when LEDs 310 are soldered into a circuit board 300, there may be misalignment between neighboring LEDs 310 and the LEDs 310 may be mounted at a slight angle. This angle and misalignment may be noticeable to a viewer and may create patterning in an overall image. Finally, potting materials generally have a relatively low durometer value. As a result, the potting material may not be stiff enough to hold the LEDs firmly in place to prevent additional misalignment from fabrication and handling processes.

Representative embodiments of the present invention use the more precise placement of the apertures 135 in the removable panel 110 for precise positioning and placement of the LEDs 310 installed on the circuit board 300. FIG. 6C shows the circuit board 300 portion and removable panel 110 portion of FIG. 6B assembled together with the LEDs 310 penetrating through the apertures 135 and extending partially into the recess 170. As the circuit board 300 and removable panel 110 are brought together, relatively small misalignment in the LEDs 310 or angled placement of the LEDs 310 may be corrected by the LEDs 310 fitting in to the more precise placement of the apertures 135. Recall from FIG. 1B that the back side 152 of the removable panel 110 may include spacers 185 disposed at various places. These spacers 185 (not shown in FIGS. 6A-6D) may be used to ensure a proper depth of penetration of the LEDs 310 into the apertures 135.

Finally, FIG. 6D shows the assembly of FIG. 6C with a sealant 175 disposed in at least a portion of the recess 170 of the removable panel 110. The sealant 175 is disposed in the recess 170 to form a seal around the sides of the LEDs 310 while still leaving the top portion of the LEDs 310 exposed for efficient transmission of the light generated by the LEDs 310, as well as leaving the leads of the LEDs 310 exposed to circulating air below the removable panel 110, which enhances cooling and prevents hot spots. The sealant 175 may be any suitable sealant, caulking, foam, or gasket-type material that can form a substantially watertight seal to protect a large portion of the LEDs 310 from exposure to the elements and prevent water and other contaminants from encroaching behind the removable panel 110 and affecting the base of the LEDs 310, the circuit board 300, and other components that may be attached to the circuit board 300. The depth of sealant 175 may be adjusted depending on such factors as the desired amount of LEDs 310 exposed above the sealant 175, height of the LEDs 310, and spacing between the removable panel 110 and the circuit board 300.

In one representative embodiment, a silicon sealant is disposed in the recess 170. The silicon sealant, as well as other suitable sealants, may also provide some adhering characteristics to assist in holding the circuit board 300 in place relative to the removable panel 110. Some representative embodiments may use the sealant 175 as a means for holding the circuit board 300 in place against the removable panel 110. With these embodiments, a simple punch device may be used to push on the fronts of the LEDs 310 to separate the circuit board 300 from the removable panel 110 such that the circuit board 300 may be easily repaired or replaced.

Keeping the LEDs 310 cool provides additional life to the LEDs 310 and enables the LEDs 310 to retain their color characteristics with less degradation of color hue and intensity. By leaving the base of the LEDs 310, the leads of the LEDs 310, the circuit board 300 and components exposed to ambient air, heat may be more readily drawn away from the LEDs 310 to keep them relatively cool.

In FIGS. 6A-6D, the recess 170 is illustrated to encompass a pixel including three LEDs 310. However, other recesses 170 are contemplated within the scope of the present invention. By way of example, and not limitation, a recess 170 may be formed around each LED, a recess 170 may be formed to encompass more than one pixel arrangement 130, and a recess 170 may be formed to encompass an entire pixel row.

While not illustrated, it will be understood by those of ordinary skill in the art that the removable panels 110 will be operably wired together and coupled to a controller configured for operating each of the removable panels 110, each of the pixels on each removable panel 110, and each color element LED within each pixel. Many wiring options may be possible, such as, for example, a serial connection between all of the panels such that the panels are essentially daisy-chained together. Furthermore, many controller configurations are possible for controlling the LEDs 310 and defining what adaptable images, in the form of still images or video, may be displayed on the display apparatus.

Although this invention has been described with reference to particular embodiments, the invention is not limited to these described embodiments. Rather, the invention is limited only by the appended claims, which include within their scope all equivalent devices or methods that operate according to the principles of the invention as described.

What is claimed is:

1. A display module for displaying at least a portion of an adaptable image, comprising:

a removable panel having a front side and a back side, the removable panel including:

a first protrusion extending along a first side of the removable panel toward the back side of the removable panel; and a second protrusion extending along a second side of the removable panel toward the back side of the removable panel, wherein the first protrusion of the removable panel and another second protrusion of another like-configured removable panel are configured to abut and to be positioned at least partially in a vertical channel formed in a vertical frame member;

at least one pixel row comprising a plurality of pixel arrangements distributed along the removable panel, each pixel arrangement including at least one aperture of a plurality of apertures formed through the front side to the back side of the removable panel; and a plurality of coupler holes formed through the front side to the back side of the removable panel near the first side and the second side of the removable panel; and a plurality of coupling devices attached to the removable panel through the plurality of coupler holes and a plurality of attachment holes through a front side and a back side of the vertical frame member near the vertical channel, wherein the plurality of coupling devices are accessible and operable from the front side of the removable panel and from the back side of the removable panel to enable attachment and removal of the removable panel from the vertical frame member.

2. The display module of claim 1, further comprising at least one substantially horizontal fin disposed on the front side of the removable panel and configured for at least partially shading the at least one pixel row.

3. The display module of claim 1, wherein the at least one pixel row includes a plurality of pixel rows.

4. The display module of claim 3, further comprising a plurality of substantially horizontal fins disposed on the front side of the removable panel and configured for at least partially shading each of the plurality of pixel rows.

5. The display module of claim 1, further comprising:

a circuit board attached to the back side of the removable panel, the circuit board comprising a plurality of light-emitting diodes (LEDs) operably coupled to the circuit board and configured such that the plurality of LEDs is disposed at least partially through the plurality of apertures.

6. The display module of claim 5, wherein each of the plurality of apertures is sized, located, and configured to substantially align each LED relative to other LEDs.

7. The display module of claim 5, wherein each pixel arrangement of the plurality comprises at least three apertures for receiving at least three LEDs to form a pixel, wherein the at least three LEDs comprise color LEDs.

8. The display module of claim 5, wherein the removable panel further comprises:

at least one recess formed in the front side of the removable panel and substantially surrounding at least one aperture of the plurality of apertures; and a sealant disposed in the at least one recess to at least partially surround lateral sides of each LED of the plurality of LEDs.

9. The display module of claim 8, wherein each recess is formed around a group of apertures, wherein the group of apertures comprises a pixel arrangement of the plurality of pixel arrangements.

10. The display module of claim 8, wherein each recess is formed around a group of apertures, wherein the group of apertures comprises a pixel row.

11. The display module of claim 5, wherein leads of the plurality of LEDs are exposed to circulating ambient air to disperse thermal energy away from the plurality of LEDs.

12. The display module of claim 1, wherein the removable panel further comprises:

a top protrusion extending along a top side of the removable panel; and a receiving rim extending along a bottom side and the front side of the removable panel, wherein the removable panel is configured to be disposed above a second like-configured removable panel such that the receiving rim of the removable panel overlaps and cooperatively engages another top protrusion on the second like-configured removable panel to substantially develop a seal between the first removable panel and the second like-configured removable panel.

13. The display module of claim 1, further comprising a gasket disposed in the vertical channel of the vertical frame member to substantially develop a seal between the removable panel and the another like-configured removable panel.

14. The display module of claim 1, wherein each of the plurality of coupling devices comprises at least one fastener with a front adjustment adaptor on a front face of the at least one fastener and a rear adjustment adaptor on a rear face of the at least one fastener.

15. The display apparatus of claim 1, wherein each of the plurality of coupling devices is configured such that rotating the plurality of coupling devices about a quarter-turn in a first direction holds the removable panel in place relative to the vertical frame member and rotating the plurality of coupling devices about a quarter-turn in a second direction enables removal of the removable panel.

16. A display apparatus, comprising:

a first display module and a second display module configured for displaying an adaptable image, wherein each of the first display module and the second display module comprises:

a removable panel including a plurality of apertures formed therethrough;

at least one pixel row comprising a plurality of pixel arrangements distributed along the removable panel, each pixel arrangement including at least one aperture of the plurality of apertures;

a first protrusion formed on a first side of the removable panel;

a second protrusion formed on a second side of the removable panel; and a plurality of coupler holes formed through a front side and a back side of the removable panel near the first side and the second side of the removable panel;

a vertical frame member, comprising:

a channel area that receives the first protrusion of the removable panel of the first display module, and that receives the second protrusion of the removable panel of the second display module; and a plurality of attachment holes extending through a front side and a back side of the vertical frame member near the channel area, wherein the plurality of attachment holes align with a corresponding coupler hole of the plurality of coupler holes; and a plurality of coupling devices inserted through the front side and the back side of the removable panels of the first display module and the second display module and through the plurality of attachment holes of the vertical frame member, wherein the plurality of coupling devices detachably couple the removable panels to the vertical frame member such that the plurality of coupling devices are accessible to be operated upon from both the front side and the back side of the removable panels.

17. A method of making a display apparatus, comprising:

forming a removable panel having a first side protrusion and a second side protrusion;

forming a plurality of apertures through the removable panel such that the plurality of apertures form at least one pixel row comprising a plurality of pixel arrangements distributed along the removable panel, wherein each pixel arrangement includes at least one aperture of the plurality;

forming at least one coupler hole through a front side and a back side of the removable panel near at least one of the first side protrusion and the second side protrusion; and detachably coupling the removable panel to at least one vertical frame member by:

disposing the first side protrusion and a second side protrusion of a like-configured second removable panel into a vertical channel of the at least one vertical frame member;

affixing at least one coupling device to the removable panel and the like-configured second removable panel through the corresponding at least one coupler hole;

disposing the at least one coupling device through a corresponding attachment hole in the at least one vertical frame member near the vertical channel such that the at least one coupling device is accessibly operable to be operated upon from the front side and the back side of the removable panel to either attach or remove the removable panel from the at least one vertical frame member.

18. The method of claim 17, further comprising:

attaching a circuit board to the back side of the removable panel, wherein the circuit board includes a plurality of LEDs operably coupled to the circuit board and configured such that the plurality of LEDs is disposed at least partially through the plurality of apertures.

19. The method of claim 18, wherein attaching the circuit board to the back side of the removable panel effects substantial alignment of each LED of the plurality of LEDs relative to other LEDs of the plurality of LEDs.

20. The method of claim 18, further comprising:

forming at least one recess in the front side of the removable panel such that the at least one recess substantially surrounds at least one aperture of the plurality of apertures; and disposing a sealant in the at least one recess to at least partially surround lateral sides of an associated LED of the plurality of LEDs disposed in the at least one aperture.

21. The method of claim 20, wherein each recess is formed around a group of apertures, and wherein the group of apertures comprises a pixel arrangement of the plurality of pixel arrangements.

22. The method of claim 20, wherein each recess is formed around a group of apertures, and wherein the group of apertures comprises a pixel row.

23. The method of claim 17, further comprising forming at least one substantially horizontal fin on the removable panel such that the at least one substantially horizontal fin is configured to at least partially shade the at least one pixel row.

24. The method of claim 17, further comprising:

forming a top protrusion extending along a top side of the removable panel; and forming a receiving rim extending along a bottom side and the front side of the removable panel.

25. The method of claim 24, wherein forming a removable panel comprises forming a plurality of removable panels and wherein the method further comprises attaching each removable panel of the plurality of removable panels to a plurality of vertical frame members by:

positioning a lower removable panel between a first vertical frame member and a neighboring vertical frame member;

positioning an upper removable panel between the first vertical frame member and the neighboring vertical frame member such that the receiving rim of the upper removable panel substantially overlaps and cooperatively engages the top protrusion on the lower removable panel; and selectively operating a plurality of coupling devices on the lower removable panel and the upper removable panel from the front side of the removable panel or from the back side of the removable panel to attach the upper removable panel and the lower removable panel to the first vertical frame member and the neighboring vertical frame member.

26. The method of claim 25, further comprising removing at least one removable panel of the plurality of removable panels from the plurality of vertical frame members by selectively operating the plurality of coupling devices from the front side of the at least one removable panel or from the back side of the at least one removable panel to enable removal of the at least one removable panel.

27. The method of claim 17, wherein forming a removable panel comprises forming a plurality of removable panels and wherein the method further comprises attaching each removable panel of the plurality of removable panels to a plurality of vertical frame members by:

positioning the right side protrusion in a vertical channel of a first vertical frame member;

positioning the left side protrusion in the vertical channel of a neighboring vertical frame member; and selectively operating the at least one coupling device from the front side of the removable panel or from the back side of the removable panel to attach the removable panel to the first vertical frame member and the neighboring vertical frame member.

28. The method of claim 27, further comprising removing at least one removable panel of the plurality of removable panels from the plurality of vertical frame members by selectively operating the at least one coupling device from the front side of the at least one removable panel or from the back side of the at least one removable panel to enable removal of the at least one removable panel.

29. The method of claim 27, further comprising disposing a sealant in the vertical channel of the first vertical frame member and the neighboring vertical frame member prior to attaching the removable panel.

30. The method of claim 27, further comprising:

forming a protrusion extending along a top side of each removable panel; and forming a receiving rim extending along a bottom side and the front side of each removable panel.

31. The method of claim 30, wherein attaching each removable panel further comprises:

positioning a lower removable panel between the first vertical frame member and the neighboring vertical frame member;

positioning an upper removable panel between the first vertical frame member and the neighboring vertical frame member such that the receiving rim of the upper removable panel substantially overlaps and cooperatively engages the protrusion of the lower removable panel; and selectively operating the at least one coupling device on the lower removable panel and the upper removable panel from the front side of the removable panel or from the back side of the removable panel to attach the upper removable panel and the lower removable panel to the first vertical frame member and the neighboring vertical frame member.

32. The display module of claim 1, wherein each coupling device of the plurality, comprises:

a cylindrical body; and at least two flanges extending radially from a rear portion of the cylindrical body, wherein each of the plurality of coupling devices is a single element disposed through the corresponding coupler hole of the removable panel and the corresponding attachment hole in a front face of the vertical frame member, and wherein the at least two flanges are aligned with at least two key slots extending radially from the corresponding attachment hole.

33. The display apparatus of claim 16, wherein each coupling device of the plurality is a single element, comprising:

a cylindrical body; and at least two flanges extending radially from a rear portion of the cylindrical body.

34. The method of claim 17, wherein the at least one coupling device is a single element that comprises a cylindrical body and at least two flanges extending radially from a rear portion of the cylindrical body, and further comprising rotating each of the plurality of coupling devices to attach the removable panel to the at least one vertical frame member by engaging the at least two flanges with a rear surface of a front face of the at least one vertical frame member.

* * * * *